Figure 1:
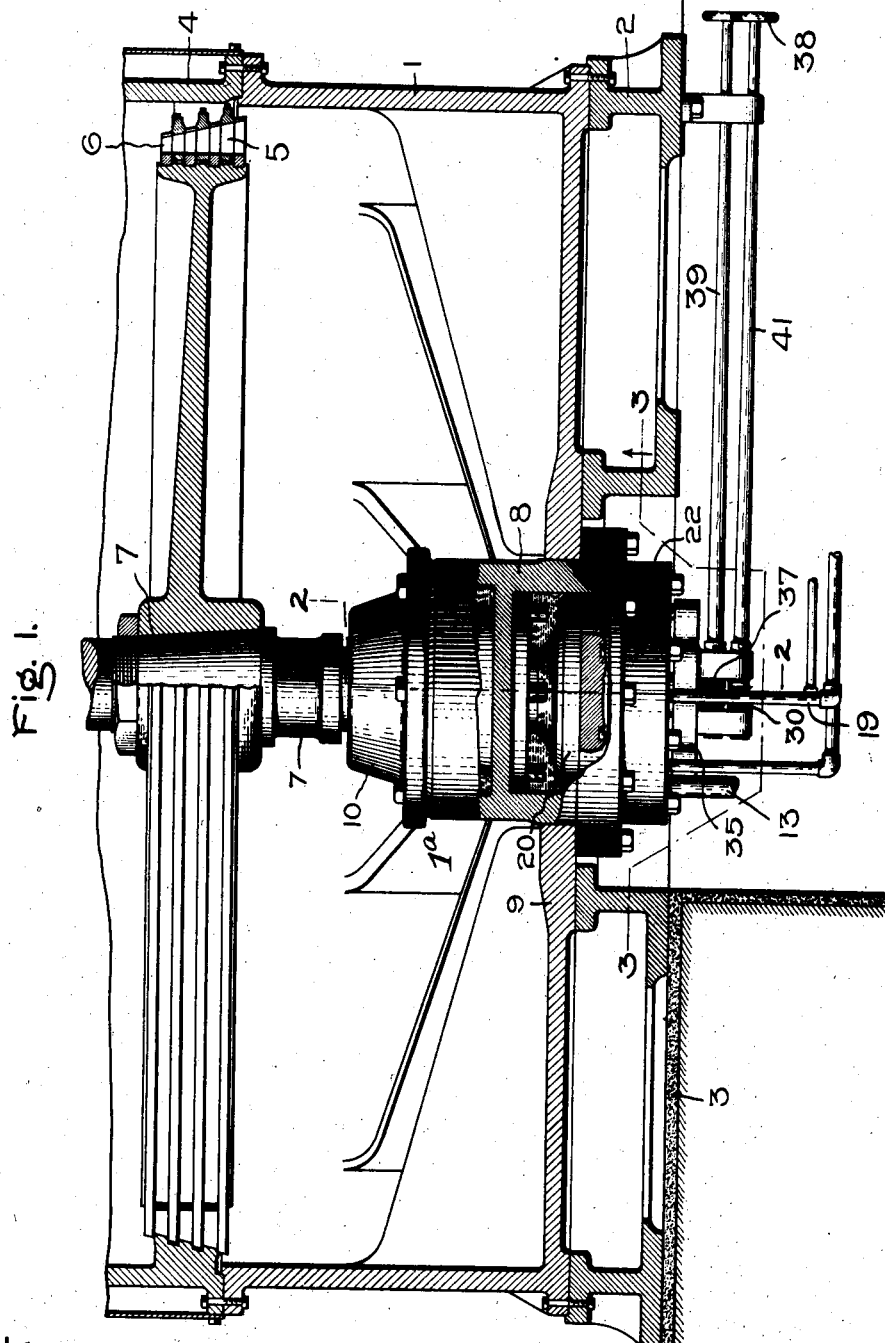

No. 834,078. PATENTED OCT. 23, 1906.
R. H. RICE.
SHAFT BEARING FOR ELASTIC FLUID TURBINES.
APPLICATION FILED MAR. 4, 1904.

3 SHEETS—SHEET 1.

Witnesses:
Edward Williams, Jr.
Alex. F. Macdonald.

Inventor,
Richard H. Rice,
By Albert G. Davis
Att'y.

No. 834,078. PATENTED OCT. 23, 1906.
R. H. RICE.
SHAFT BEARING FOR ELASTIC FLUID TURBINES.
APPLICATION FILED MAR. 4, 1904.

3 SHEETS—SHEET 2.

Witnesses:
Edward Williams, Jr.
Alex. F. Macdonald.

Inventor,
Richard H. Rice,
By Albert G. Davis
Att'y.

No. 834,078. PATENTED OCT. 23, 1906.
R. H. RICE.
SHAFT BEARING FOR ELASTIC FLUID TURBINES.
APPLICATION FILED MAR. 4, 1904.
3 SHEETS—SHEET 3.
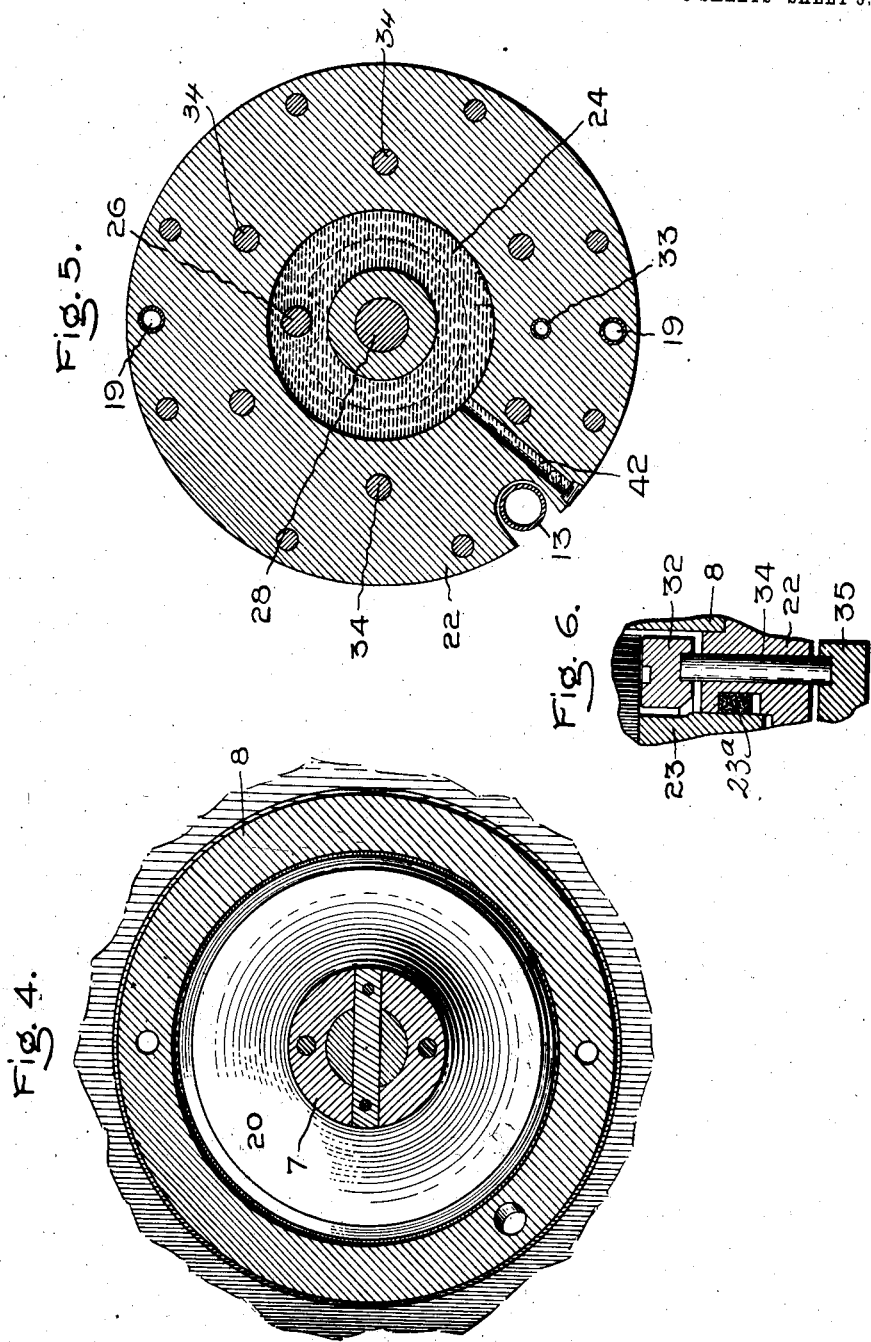
Witnesses:
Edward Williams, Jr.
Alex F. Macdonald.
Inventor,
Richard H. Rice,
By Albert G. Davis
Att'y.

UNITED STATES PATENT OFFICE.

RICHARD H. RICE, OF SWAMPSCOTT, MASSACHUSETTS, ASSIGNOR TO GENERAL ELECTRIC COMPANY, A CORPORATION OF NEW YORK.

SHAFT-BEARING FOR ELASTIC-FLUID TURBINES.

No. 834,078.          Specification of Letters Patent.          Patented Oct. 23, 1906.

Application filed March 4, 1904. Serial No. 196,486.

*To all whom it may concern:*

Be it known that I, RICHARD H. RICE, a citizen of the United States, residing at Swampscott, in the county of Essex, State of Massachusetts, have invented certain new and useful Improvements in Shaft-Bearings for Elastic-Fluid Turbines, of which the following is a specification.

The present invention relates to shaft-bearings, such as step or thrust bearings, and more especially to those which support a turbine-shaft in a vertical position and sustain all, or substantially all, of the weight of the moving parts. When bearings of this character are employed to support heavy structures or structures having relatively high surface speed at the bearing, or both, it is necessary to supply them with oil or other lubricant under forced circulation and at relatively high pressures, and this is especially true where a film of lubricant is maintained at all times for separating the relatively movable surfaces. The adjacent surfaces of the bearings are usually scraped to give them as smooth a finish as possible. When the pressure on the lubricant falls below a certain point, it is evident that the bearing-surfaces will contact, and since the pressure is too low to maintain the parts separated it will be insufficient to force lubricant through the adjacent surfaces, although a small amount may work through, due to the relative rotation of the parts. It is obvious that when the parts of the bearing come together and the turbine continues to run it will injure the surfaces of the step or thrust bearing blocks. The contacting of these blocks wears a substantial amount of metal off of the opposing surfaces, besides leaving them rough. Moreover, it is only possible under these conditions to continue the operation for a short time.

In the operation of prime movers, especially those used for driving electric generators, and particularly when the load on the system is heavy, it is of the utmost importance to keep the machines going, since the shutting down of one unit without a substitute, as is generally the case, usually, if not always, means cutting off the supply of light to consumers or power for other purposes.

The present invention has for its object to obviate the necessity of shutting down the prime mover in case the supply of lubricant fails and also to prevent injury to the bearing-surfaces under such circumstances.

In carrying out my invention a bearing-block is keyed or otherwise attached to the shaft. When the invention is used with a thrust-bearing, the block is located at any convenient place, and, when used with a step-bearing, at one end. Assuming, for example, the latter illustration of my invention, the lower block instead of being rigidly supported, as is usually the case, is supported by fluid under pressure. The fluid for supporting the block may be the same as that used for lubricating purposes or it may be a separate source. I consider it best to use the lubricating fluid, since by so doing the arrangement is much simplified. The upward movement of the lower block is limited to a predetermined point by means of a suitable abutment located within the casing. The abutment is preferably adjustable to enable the block to be raised or lowered, so as to adjust the clearances between the wheel and intermediate buckets and also between the wheel-buckets and nozzle or nozzles. By means of this adjustable arrangement of parts the shaft and wheels can be raised or lowered to compensate for temperature changes, which changes may, and usually do, cause the unequal expansion of the moving and stationary parts and sometimes a warping or twisting of the wheel itself. The lower block is suitably guided and when the lubricating fluid also acts as the supporting-medium is subjected to differential pressures on its opposite surfaces. The under surface is subjected to a pressure due to the incoming lubricant, while the upper surface, which presents a somewhat smaller area, is subjected for a portion of its area to the full pressure and for the remainder to a pressure which decreases gradually toward the periphery. In other words, the pressure tending to lift the block is greater than the tendency to depress it, due to the weight of the moving parts and the fluid-pressure on the upper surface. The preponderance of one pressure over the other can be widely varied; but it should be great enough at all times to insure the seating of the lower or movable block on the abutment. With this arrangement the pressure on the abutment is equal to the difference in fluid-pressures on opposite sides of the block, minus that due to the weight of the moving parts.

Surrounding the lower bearing-block, or otherwise suitably located for engagement with a block fixed on the shaft, is an auxiliary bearing-block which, under abnormal conditions, supports the weight of the moving parts. It is advantageous to enlarge the upper block that is affixed to the shaft, so that it may act as a part of both the main and auxiliary bearings, so that it reduces complication; but a separate auxiliary block can be provided, if desired. The auxiliary block may be provided with a lubricating-groove or not, as desired. In the former case it will act like an ordinary step or thrust bearing and in the latter case as a brake. It will be found advantageous to pipe this bearing to the city or other water supply under pressure, in which case the auxiliary bearing will carry the load when for any reason the main bearing fails. When the pressure on the main bearing falls below a certain point, the auxiliary bearing takes up the work. It is unnecessary that there should be a complete failure of pressure. Under abnormal conditions the auxiliary bearing-blocks are separated by a clearance which is less than that between the buckets or buckets and nozzle.

The lubricant exhausting from the main or from the auxiliary bearing, or both, is collected and discharged into a guide-bearing located above the step, and after lubricating the guide-bearing is returned to the pump or reservoir.

The main and auxiliary bearings are adjustable with respect to each other and with respect to the block or blocks on the shaft. The auxiliary block is carried by supports which pass through the bearing-casing and engage a platen or equivalent device, which is movable, to adjust the position of the block. In this manner the auxiliary bearing can be adjusted from a point outside of the bearing-casing and outside of the turbine, and this without stopping the turbine.

In order to restrict the size of the bearing and to simplify its construction, the main and auxiliary bearing-blocks are inclosed by the same casing and intimately associated; but it is within the scope of the broader features of my invention to locate the blocks differently. The arrangement described simplifies the alinement and adjustment of parts, and where small clearances are employed between the buckets and nozzles, such as .02 to .05 of an inch, this becomes a most important consideration. Ordinarily, in setting the parts the auxiliary bearing would be moved into contact and then backed off by an amount substantially equal to the thickness of the lubricant-film between the main bearing-surfaces. After the main bearing fails and the auxiliary bearing or bearings take up the work, it or they are adjusted to give equal clearances between the buckets and fluid-discharging devices.

Figures 2, 3:
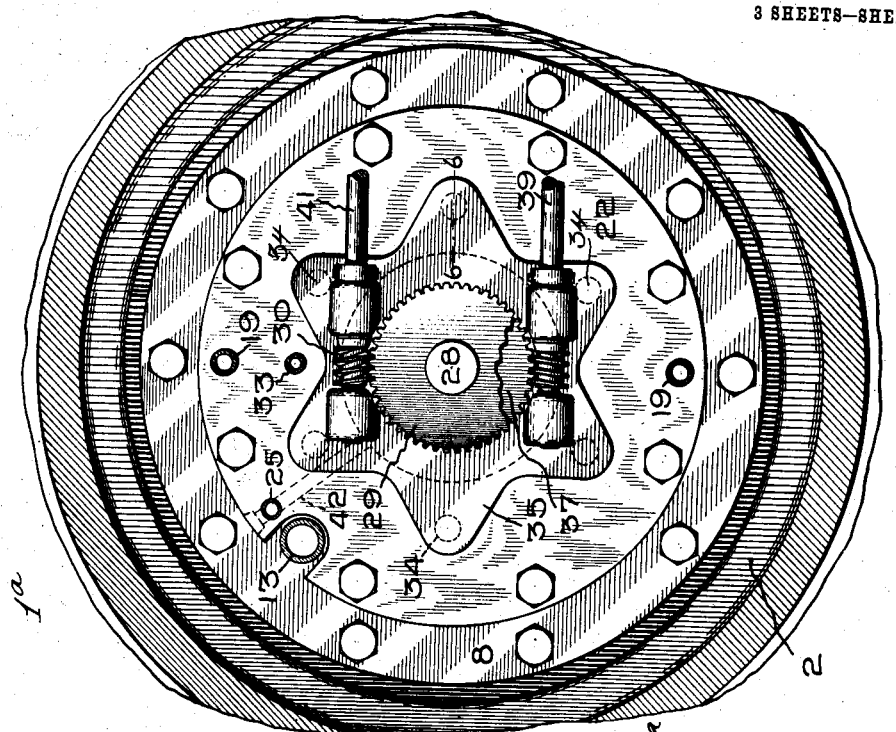

In the accompanying drawings, which illustrate one embodiment of my invention, Figure 1 is a partial vertical section of an elastic-fluid turbine of the vertical-shaft type. Fig. 2 is a section through the step-bearing taken on line 2 2 of Fig. 1. Fig. 3 is an inverted sectional view taken on line 3 3 of Fig. 1 and looking in the direction of the arrow. Fig. 4 is a cross-section of the bearing, taken on line 4 4 of Fig. 2 looking in the direction of the arrow. Fig. 5 is a sectional view taken on the line 5 5 of Fig. 2 looking in the direction of the arrow, and Fig. 6 is an enlarged detail showing the means employed for supporting the auxiliary bearing.

1 represents the base of the machine containing a chamber which may or may not be connected to a condenser, as desired, and within the chamber is located a step-bearing $1^a$. The casing is mounted on a subbase 2, which in turn is supported by a masonry foundation 3. Mounted above the base is a wheel-casing 4 of suitable construction. Attached to the casing are intermediate buckets 5, which are separated from the nozzles (not shown) and wheel-buckets 6 by a relatively small clearance—say, for example, from .02 to .05 of an inch. The wheel-buckets 6 are arranged in rows and mounted on a suitable wheel, which in turn is carried by the vertical shaft 7.

Referring to Fig. 2, the construction of the bearing will be described in detail. 8 represents the bearing-casing, which is provided with a flange on the lower end that is bolted to the under side of the wall 9 of the turbine-casing. The opening in this wall is finished and forms a means for centering the bearing when mounted in position. The upper end of the casing is provided with a cover 10, which is bolted thereto and is centered by means of a shoulder formed on its under surface. The cover contains two chambers in which are located carbon packing-rings 11 and 12. These prevent the entrance of water or moisture from the condenser-chamber into the lubricant, also the passage of oil into the chamber. Under normal conditions of operation steam or other fluid under pressure is supplied to the chamber containing the packing-ring 12 by the pipe 13. The upper part of the bearing-casing is provided with an internal projection 14, which is shouldered on the under side to receive the flange 15 of the guide-bearing. This bearing is provided with lubricant-carrying grooves 16, which communicate with passages 17, leading into a chamber $16^a$, formed between the bearing and the projection on the casing. This chamber in turn communicates with the enlarged cylindrical chamber 18, and the latter is drained by the pipes 19, which may or may not be connected together. On the lower end of the shaft and secured thereto by a key is the upper bearing-block 20, which is provided with a small chamber 21 on its under side, which registers with a similar chamber on the lower bearing-block. The portion of the upper bearing-block opposite the lower main bearing-block should be scraped or otherwise given a smooth finish, while the portion of the surface surrounding the lower block can be scraped or not, as is desired. The outer portion, which forms the upper block of the auxiliary bearing, can be made a part of the main block or separate.

Bolted to the under side of the casing is a base 22, which supports the weight of the shaft and parts attached thereto and also the main and auxiliary step-bearing blocks. The base is chambered out centrally to receive the hydraulically-supported bearing-block 23, which in construction is similar to a piston. The outer cylindrical surface of the lower block 23 where it engages the cylinder in the base is turned off true, and between the moving and stationary parts is a packing 23ª to prevent the escape of lubricant from the high to the low pressure side of the bearing. The under side of the block is provided with a chamber 24, opening into the cylinder-space, and into which fluid under high pressure is admitted by the pipe 25 and passage in the base. The block is prevented from turning by one or more pins 26, which are seated in the base. The upper surface of the bearing is provided with a central chamber corresponding to that in the upper bearing-block, and this chamber communicates with the cylinder-space on the under side thereof by means of a passage 27. The actual areas of the top and bottom surfaces of the block 23 are dissimilar, and the block is subjected to a greater pressure on the under side than on the upper. This is due to three principal things: first, that the pressure gradually decreases from the wall of the chamber 21 to the periphery of the block while the under side of the block is exposed to high pressure; second, that the central part of the block is covered by the head of the spindle, which is larger than its body, and, third, the difference in areas. This unbalanced relation as to pressures on the lower block gives it a tendency to move upward at all times, and in order to limit this tendency the abutment or spindle 28 is provided, having an enlarged head which engages the block and a screw-threaded lower end which receives a nut formed on the worm-wheel 29. The worm-wheel meshes with a worm 30, and as the latter is rotated by a suitable shaft the abutment is raised or lowered, and therefore the position of the lower block changed. Obviously a change in position of the lower block causes a change in position of the upper block. The spindle passes through a sleeve 31, formed on the under side of the base, and between the spindle and the sleeve is a packing for preventing the high-pressure lubricant from escaping. Surrounding the lower block and engaging with its bearing-block or a different one is an auxiliary bearing-block 32. This block is provided with a lubricating-groove on its upper surface and connected to the groove in a manner to supply lubricant thereto—such as oil, water, or steam—is a pipe 33, which passes upward through the base. The lower auxiliary bearing-block is supported by a number of pins 34, spaced at suitable distances apart around the axis of the spindle. These pins engage with the bearing-block at their upper ends and at the lower ends are seated on a platen 35, the latter being provided with as many arms as there are pins, as shown in Fig. 3. The auxiliary bearing-block being located on the low-pressure side of the bearing, it will usually be found unnecessary to use packings; but they may be used if desired. The platen is provided with a central opening through which passes the screw-threaded sleeve 31, formed on the base. Mounted on the lower end of the sleeve is a nut 36, which is attached to a worm-wheel 37, and the latter meshes with and is turned by a worm. As the worm is rotated in one direction or the other the platen is caused to move up or down, as the case may be, and with it the lower auxiliary bearing-block.

Under normal operating conditions the auxiliary bearing should be separated from the upper bearing-block by a small clearance, which clearance should be less than that between the revolving and stationary parts of the turbine, such as the wheel and intermediate buckets or the nozzle and the intermediate buckets, so that if anything happens to decrease the pressure on the step-bearing to a point where it can no longer sustain the weight of the moving parts the work of supporting it will fall on the auxiliary bearing, and this before the moving and stationary parts have had an opportunity to come into contact. In adjusting the parts for normal operation the abutment 28 should permit the lower block 23 to rise to a point where it will support the shaft and attached parts, yet permit them to run free with respect to the nozzle and intermediate buckets where such buckets are employed. After lubricant passes from the inlet-pipe 25 to the chambers 24 and 21, thence through the space between the upper and lower blocks into the chamber in which the auxiliary bearing is located and into the chamber 40, it flows upward through grooves formed in the guide-bearing and after lubricating the same is discharged into the chamber 18, from which it is collected by the pipes 19.

Referring again to Fig. 1, 30 represents the worm for adjusting the position of the lower block, and 41 the shaft which actuates the worm and is turned by the hand-wheel 38, located near the edge of the subbase. The worm for raising and lowering the platen and the auxiliary bearing is operated by the shaft 39, which is provided with a hand-wheel, also located near the edge of the sub-base. By reason of this construction the bearing can be adjusted without trouble.

Referring to Fig. 4, 20 represents the upper bearing-block that is attached to the lower end of the shaft 7, and 8 represents the casing which surrounds the parts.

In Fig. 5, 28 represents the abutment or spindle which limits the upward movement of the lower bearing-block; 24, the chamber which receives lubricant under high pressure from the pipe 25 and passage 42. 26 represents the pin which prevents the lower bearing-block from rotating independently of the base of the bearing-casing, and 19 the pipes which drain the bearing-casing after the oil or other lubricant passes between the bearing-surfaces.

In Fig. 6 is shown on an enlarged scale the means employed to support the lower auxiliary bearing-block. 32 represents the lower block, which is separated from the upper by a small space, the latter being somewhat exaggerated for purposes of illustration. Engaging the lower end of the supporting-pin 34, which passes through the base 22, is the platen 35.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination of a movable element, a bearing-block hydraulically supported and urged toward the element, and means for maintaining a fluid film between the element and the block.

2. The combination of a movable element, a casing, a bearing-block, means for maintaining fluid-pressure between the casing and the block to support the latter in operative relation to the element, and means for maintaining a fluid film to separate and lubricate the element and the fluid-supported block.

3. In a shaft-bearing, the combination of a bearing-block which is attached to and rotatable with the shaft, a second block suitably mounted to oppose the first, and a source of hydraulic pressure for urging the second block toward the first.

4. In a shaft-bearing, the combination of a bearing-block rotating with the shaft, and a second movable block which opposes the first and is subjected to a differential fluid-pressure.

5. A shaft-bearing comprising relatively rotating bearing-blocks, in combination with a source of pressure which acts differentially on the opposite surfaces of one of the blocks to move it in a given direction, and a means for limiting the movement of the block that is moved by said pressure.

6. A shaft-bearing comprising relatively rotating bearing-blocks, in combination with a source of fluid-pressure acting differentially on one of the blocks, and an adjustable means for limiting the movement of the last-mentioned block.

7. In a shaft-bearing, the combination of a bearing-block rotating with the shaft, a second bearing-block which opposes the first, a source of fluid-supply which urges the second block toward the first and also maintains a lubricating-film between them, and an adjustable means for limiting the movement of the second block in the direction of the first.

8. In a shaft-bearing, the combination of bearing-blocks which are relatively movable, there being a chamber located between the blocks, which supplies lubricant to maintain a film between the blocks, and a means for supplying fluid under pressure to move the blocks toward each other and also to supply fluid to the chamber to maintain the said film.

9. In a shaft-bearing, the combination of a bearing-block rotating with the shaft, a second block opposing the first, there being a chamber formed between the blocks, a conduit for conveying fluid from one surface of the second block to the other, a means for supplying fluid under pressure which urges the second block in one direction and supplies lubricants to the chamber, and means for preventing the second block from turning.

10. A shaft-bearing comprising relatively moving bearing-blocks, in combination with a source of fluid under pressure which normally urges the blocks toward each other and permits them to separate when the pressure on the fluid source decreases below a certain point.

11. In a bearing of the character described, the combination of a bearing-block movable with the shaft, a second block opposing the first, a casing for the blocks, a guide for the second block, carried by the casing, and a means for supplying fluid under pressure to move the second block on its guides.

12. In a bearing of the character described, the combination of a bearing-block movable with the shaft, a second block opposing the first, a casing for the blocks, a base for the casing, which is detachably secured thereto, a guide for the second block, formed on the base, a means for moving the blocks toward each other, and a means passing through the base for limiting the relative movement of the blocks toward each other.

13. In a bearing, the combination of a block attached to the shaft, a loose piston-like block which opposes the first, a cylinder in which the latter block is movably mounted, a conduit communicating with opposite sides of the piston-like block, a means for supplying fluid under pressure to the cylinder, and an abutment for limiting the position of the piston-like block.

14. In a bearing, the combination of a block attached to the shaft, a piston-like block which opposes the first, a cylinder in which the block is mounted, a conduit communicating with opposite sides of the piston-like block, a means for supplying fluid under pressure to the cylinder, an abutment for limiting the position of the piston-like block, and a means for adjusting the abutment.

15. In a shaft-bearing, the combination of a bearing-block attached to the shaft, a casing therefor containing a cylinder, a second bearing-block which is loosely mounted within the cylinder and is guided thereby, and a means for supplying fluid under pressure to the cylinder for moving the second block into engagement with the first.

16. In a shaft-bearing, the combination of a bearing-block attached to the shaft, a casing therefor, a guide-bearing carried by the casing and engaging the shaft, a detachable base for the casing, which contains a cylinder, a bearing-block mounted within the cylinder and movable toward or away from the shaft, a conduit in the block for conveying lubricating fluid from one surface to the other, and means for supplying lubricant under pressure to move the second block into operative position and also to lubricate the surfaces.

17. In a bearing of the character described, the combination of relatively movable bearing-blocks, there being a chamber formed between the blocks, which receives lubricant, a hydraulic means for moving the lower block, a spindle which controls the movement of the lower block and is located in line with the axis of the shaft, gearing for adjusting the spindle, and a conduit supplying fluid under pressure for moving the lower block.

18. In a bearing of the character described, the combination of a casing, a guide-bearing carried thereby and engaging the shaft, an upper bearing-block attached to the end of the shaft, a piston which forms a bearing-block, the said blocks forming a step-bearing, a cylinder for the piston formed in the casing, a means which receives exhaust lubricant from the step-bearing and discharges it into the guide-bearing, and a source of fluid-supply which elevates the piston and supplies lubricant to the step and guide bearings.

19. A bearing comprising relatively movable bearing-blocks, in combination with an auxiliary bearing-block which comes into service under abnormal conditions.

20. A bearing comprising relatively movable main bearing-blocks, in combination with an auxiliary bearing-block which comes into service under abnormal conditions, a stationary support for the auxiliary block, and a support for one of the main bearing-blocks, which yields under abnormal conditions.

21. In a bearing, the combination of bearing-blocks which are of different diameters, with an auxiliary bearing-block which under abnormal conditions engages the block of larger diameter.

22. In a bearing, the combination of a main bearing-block with a pair of bearing-blocks located concentrically one within the other for engagement with said main block.

23. In a bearing, the combination of a bearing-block, a second bearing-block opposing the first and of smaller diameter, and an auxiliary block which under abnormal conditions engages the first block on a surface surrounding the second block.

24. In a bearing, the combination of a main bearing-block, a second bearing-block opposing the first, an auxiliary bearing-block which under abnormal conditions relieves the second block of its load, and means for causing successive engagement of the second and auxiliary blocks.

25. In a bearing, the combination of a main bearing-block, a second bearing-block opposing the first, an auxiliary bearing-block which under abnormal conditions relieves the second block of its load, and a fluid-pressure means which normally holds the first block out of working relation with the auxiliary block.

26. In a bearing, the combination of a main bearing-block, a second bearing-block opposing the first, an auxiliary bearing-block which under abnormal conditions relieves the second block of its load, mechanism for adjusting the auxiliary block, and a means for normally sustaining the second bearing-block in working relation with the first, and the latter out of working relation with the auxiliary block.

27. In a step-bearing, the combination of relatively movable main blocks, an auxiliary block for relieving one of the main blocks under abnormal conditions, a casing for the blocks, a platen located outside of the casing for adjusting the auxiliary block, a spindle passing through the casing for regulating the position of one of the main blocks, and means which urge the main blocks toward each other.

28. In a step-bearing, the combination of relatively movable main blocks, an auxiliary block for relieving one of the main blocks under abnormal conditions, a casing for the blocks, a sleeve or extension on the under side of the casing, a means for adjusting the auxiliary block, which is mounted on the sleeve, a spindle for regulating the position of one of the blocks which passes through the sleeve, and an adjusting-nut on the spindle, which engages the end of the sleeve.

29. In a step-bearing, the combination of relatively movable main bearing-blocks, means for moving the blocks toward each other, an auxiliary block, a casing for the blocks, having a screw-threaded sleeve thereon, a nut on the sleeve for adjusting one of the bearing-blocks, a screw-threaded spindle which passes through the sleeve for regulating the movement of one of the main blocks, and a nut on the spindle for adjusting it, which engages the end of the spindle.

30. In a step-bearing, the combination of relatively movable main bearing-blocks, means for moving the blocks toward each other, an auxiliary bearing-block, a casing for the blocks, a sleeve carried by the casing, and adjusting devices for the blocks, which are supported by the sleeve.

31. In a step-bearing, the combination of relatively movable main bearing-blocks, an auxiliary block, means for supplying lubricant to the main blocks, and separate means for supplying lubricant to the auxiliary bearing.

32. In a step-bearing, the combination of relatively movable main bearing-blocks, an auxiliary block, means for supplying lubricant to the main blocks, separate means for supplying lubricant to the auxiliary bearing, and a means which receives the exhaust lubricant from the main and auxiliary bearings.

33. In a bearing of the character described, the combination of main bearing-blocks, an auxiliary bearing-block, a guide-bearing, a means which receives lubricant from both the main and auxiliary bearings and discharges it into the guide-bearing, a source of fluid under pressure for lubricating the main bearing, and a separate source of fluid also under pressure for lubricating the auxiliary bearing.

34. In a bearing of the character described, the combination of main bearing-blocks, an auxiliary bearing-block, separate sources of fluid under pressure for lubricating the main and auxiliary bearings, a guide-bearing, a means which receives exhaust fluid from the main and auxiliary bearings and discharges it into the guide-bearing, and a collection means which receives the lubricant after it passes through the guide-bearing.

35. In a bearing of the character described, the combination of main bearing-blocks, an auxiliary bearing-block, a casing which incloses the blocks, adjusting devices for the blocks, which are situated one above the other and below the casing, and gearing for actuating the adjusting devices.

36. In combination, a shaft, a bucket-wheel, devices for discharging motive fluid to the buckets, which are separated therefrom by a small clearance, a bearing for supporting the shaft, and an auxiliary bearing, the blocks of which are normally separated by an amount less than the clearance between the buckets and discharging devices.

37. A shaft-bearing comprising a bearing-block moving with the shaft, a second bearing-block for resisting movements of the first, and a source of hydraulic pressure which normally maintains the second block in its operative position and also maintains a separating film of lubricant between the opposed surfaces of the blocks.

38. A shaft-bearing for turbines comprising a rotating member, main and auxiliary bearing-blocks which individually are adapted to support the said member under different conditions, means for hydraulically supporting the main block, and adjustable means for rigidly supporting the auxiliary block.

In witness whereof I have hereunto set my hand this 2d day of March, 1904.

RICHARD H. RICE.

Witnesses:
JOHN A. MCMANUS, Jr.,
DUGALD McK. McKILLOP.